United States Patent
Petrzik et al.

(10) Patent No.: US 7,338,408 B2
(45) Date of Patent: Mar. 4, 2008

(54) HYDRAULIC CIRCUIT AND METHOD FOR CONTROLLING SAID CIRCUIT

(75) Inventors: Gunther Petrzik, St. Georgen (DE); Guenter Ruehle, Loechgau (DE); Josef Neuner, Raubling (DE)

(73) Assignees: Getrag Getriebe- und Zahnradfabrik Hermann Hagenmeyer GmbH & Cie AG, Untergruppenbach (DE); Bayerische Motoren Werke Aktiengesellschaft, München (DE)

( * ) Notice: Subject to any disclaimer, the term of this patent is extended or adjusted under 35 U.S.C. 154(b) by 0 days.

(21) Appl. No.: 11/580,499

(22) Filed: Oct. 13, 2006

(65) Prior Publication Data
US 2007/0123388 A1    May 31, 2007

Related U.S. Application Data
(63) Continuation of application No. PCT/EP2005/003585, filed on Apr. 6, 2005.

(30) Foreign Application Priority Data
Apr. 14, 2004  (DE) ...................... 10 2004 018 962

(51) Int. Cl.
   *B60W 10/00* (2006.01)
   *B60W 10/02* (2006.01)
   *B60W 10/04* (2006.01)
(52) U.S. Cl. .................. 477/174; 477/86; 477/906
(58) Field of Classification Search ............. 477/86, 477/174, 906, 907; 74/330, 331
See application file for complete search history.

(56) References Cited

U.S. PATENT DOCUMENTS
6,055,879 A * 5/2000 Abe et al. ..................... 74/335
7,153,234 B2 * 12/2006 Berger et al. ................. 477/86

FOREIGN PATENT DOCUMENTS
| DE | 101 48 087 A1 | 5/2002 |
| DE | 101 20 882 A1 | 10/2002 |
| DE | 101 34 115 A1 | 1/2003 |
| DE | 101 38 395 A1 | 2/2003 |
| DE | 102 38 104 A1 | 3/2004 |
| EP | 0 802 355 A2 | 10/1997 |
| WO | WO 03/074909 A2 | 9/2003 |

* cited by examiner

*Primary Examiner*—Tisha Lewis
(74) *Attorney, Agent, or Firm*—Knobbe, Martens, Olson & Bear LLP (57) ABSTRACT

A method for controlling a hydraulic circuit for a twin-clutch transmission, wherein the hydraulic circuit comprises a first and a second clutch that can be hydraulically actuated, the pressures of said clutches being controlled with respective pressure control valves, and wherein a safety circuit substantially guarantees a safe state for the hydraulic circuit if a malfunction occurs. The safety circuit is configured such that if a partial malfunction affecting only one of the two clutches occurs, the affected clutch is disengaged and if a total malfunction affecting both clutches occurs, the clutch with the lower clutch pressure at the time of the total malfunction is disengaged and the other clutch with the higher clutch pressure at the time of the total malfunction remains engaged to maintain the transfer of torque via said clutch.

18 Claims, 9 Drawing Sheets

HYDRAULIC CIRCUIT AND METHOD FOR CONTROLLING SAID CIRCUIT

CROSS-REFERENCE TO RELATED APPLICATION

This application is a continuation application of international patent application PCT/EP2005/003585, filed Apr. 6, 2005, which claims priority of German patent application DE 10 2004 018 962.5, filed Apr. 14, 2004, the disclosures of which are incorporated herein by reference in their entirety.

BACKGROUND OF THE INVENTION

1. Field of the Invention

The present invention relates to a method for controlling a hydraulic circuit for a twin-clutch transmission for motor vehicles, wherein the hydraulic circuit comprises a first and a second clutch that can be hydraulically actuated, the pressures of said clutches being controlled with respective pressure control valves, and wherein a safety circuit substantially guarantees a safe state for the hydraulic circuit if a malfunction occurs.

The present invention also relates to a hydraulic circuit for a twin-clutch transmission for motor vehicles, comprising a first and a second clutch that can be hydraulically actuated, having a first and a second clutch circuit, wherein the first clutch circuit comprises a first pressure control valve for controlling a first clutch pressure for the first clutch, and wherein the second clutch circuit comprises a second pressure control valve for controlling a second clutch pressure for the second clutch, and comprising a safety circuit which guarantees a safe state for the hydraulic circuit if a malfunction occurs.

2. Description of the Related Technology

Twin-clutch transmissions for motor vehicles have recently attracted particular interest. They are based on the basic concept of conventional manual transmissions but have two disengageable clutches. One disengageable clutch connects an engine output shaft to a first transmission branch which includes, for example, gear steps 1, 3, 5, etc. The second disengageable clutch connects the engine output shaft to a second parallel transmission branch which includes, for example, gear steps 2, 4, 6, etc.

The outputs (main drive pinions) of the two transmission branches are connected to a common output shaft which is connected to the driving wheels of the motor vehicle.

Overlapping actuation of the disengageable clutches enables overlapping gear changes of neighboring gear steps to be performed without interrupting the tractive force. This makes twin-clutch transmission very comfortable. Due to the fact that the transmission of force is performed in a frictionally engaged and/or positive-locking manner, comparably high efficiency can also be achieved.

Twin-clutch transmissions can generally only be operated automatically. Particular safety precautions must be taken in such cases to prevent two gear steps from being engaged simultaneously and loaded simultaneously via the disengageable clutches. This could result in the destruction of the wheel sets and/or the disengageable clutches. The disengageable clutches are generally hydraulically controlled clutches. The disengageable clutches can be constructed as dry clutches. It is, however, advantageous if the disengageable clutches are constructed as wet clutches, in particular as wet multiple-disk clutches.

The pressure control of the two disengageable clutches must be fast and, nevertheless, sensitive.

Some hydraulic circuits for the hydraulic control of a twin-clutch transmission comprise a first partial circuit for the first disengageable clutch and the first transmission branch as well as a second partial circuit for the second disengageable clutch and the second transmission branch.

The partial circuits are connected on the input side with a hydraulic supply respectively by means of release valves. The release valves are constructed in this case as "fail-safe" valves. In normal operation, the release valves are released electrically. When a failure of the electrical control occurs, the release valves are moved by springs to a disengaged position in which the partial circuits are disengaged from the hydraulic supply. At the same time, the hydraulic partial circuits are depressurized by connecting them with a tank. This disengages the two disengageable clutches. As a result, if such a malfunction occurs, the vehicle coasts and then comes to a halt.

Some embodiments have an emergency actuation device for an automated controllable clutch which is constructed so as to close passively. In this case, the emergency actuation device comprises a pressure accumulator as an auxiliary energy store for emergency actuation.

In some embodiments an arrangement comprising two check valves and a pressure limitation valve ensures that a pressure acting on the clutches does not exceed a maximum value.

Some embodiments have a hydraulic circuit for an automatic transmission. Instead of a hydrodynamic converter, the automatic transmission comprises a transmission clutch and/or a brake as a starting device.

To enable emergency operation even if the vehicle comes to a stop, it is provided that, if a malfunction occurs, the automatic transmission is controlled with a signal dependent on the vehicle speed and/or the engine speed. This enables the traction from the drive to the engine to be interrupted in a timely manner in order not to "stall" the engine in emergency operation.

SUMMARY OF CERTAIN INVENTIVE ASPECTS

One inventive aspect is a an improved method of controlling a hydraulic circuit for a twin-clutch transmission and such a hydraulic circuit itself, wherein comfort and safety are significantly improved if malfunctions occur.

Some embodiments use the method described above for controlling a hydraulic circuit for a twin-clutch transmission and in the case of the above mentioned hydraulic circuit by configuring the safety circuit in such a way that if a partial malfunction affecting only one of the two clutches occurs, the affected clutch is disengaged and if a total malfunction affecting both clutches occurs, the clutch with the lower clutch pressure at the time of the total malfunction is disengaged and the other clutch with the higher clutch pressure at the time of the total malfunction remains engaged to maintain the transfer of torque via said clutch.

At least the following may be achieved by these measures.

If a malfunction affecting only one clutch occurs, the affected clutch is disengaged and therefore "switched off". The hydraulic circuit can, however, remain active for the other clutch not affected by the malfunction. If this partial malfunction occurs, the vehicle can be operated like an automated transmission using the remaining clutch, wherein each second gear is missing in said transmission. For example, if the unaffected clutch operates the transmission branch with gears 2, 4, 6, etc., starting is possible, for example, in the second gear. At higher speeds, a switch can be performed from the second to the fourth gear, and possibly to the sixth gear. This means that quite normal driving operation can be covered including operation within the city, on motorways, etc. It goes without saying that such gear changes include a reduction in tractive force. However, due to the fact that the functionality of the transmission is maintained, the vehicle can still be driven by the driver for some time before it is taken to a garage. There is no need to use an emergency breakdown service or the like.

When a total malfunction affecting both clutches occurs, it is generally proposed to disengage both disengageable clutches. This means that the vehicle coasts.

In the present case, it is however proposed not to disengage the disengageable clutch subjected to a higher pressure at the time of the total malfunction, i.e. the currently active clutch, in order to maintain the present driving state.

For example, an overtaking maneuver which has already been started when the total malfunction occurs can thus be concluded due to the fact that the transfer of torque to the output is not decreased abruptly, but rather is maintained via the still engaged clutch.

As a result, overall driving safety is significantly increased.

It may be particularly advantageous if a clutch is disengaged by disengaging the connection between the clutch and the assigned pressure control valve to reduce the clutch pressure.

In an embodiment with this aspect, the influence on the clutch is directly in the area of the clutch pressure. Due to the fact that the pressure control valve is not affected by this, the pressure control valve can be optimized in terms of its actual tasks, namely controlling the clutch pressure in the normal state. A clutch can also be disengaged more quickly than in cases in which the pressure control valve and hydraulic supply are disengaged from each other.

It may be furthermore advantageous if the clutch pressure is reduced when disengaging the clutch by depressurizing the clutch.

This can be achieved, for example, using a directional control valve which connects the clutch, for example, with the tank.

Therein, it can be provided that the clutch pressure falls immediately.

It may be, however, particularly advantageous if the clutch pressure is gradually reduced when disengaging the clutch.

This reduces torque impacts. For example, this can be achieved by integrating a restriction orifice or the like into the connected conduit from the clutch to the tank.

Furthermore, it may be particularly advantageous if the safety circuit disengages a clutch with a mechanical or hydraulic energy store.

This means that the safety circuit can satisfy the desired functionality even if the electrical power supply, including the supply of an electrical control device, has failed.

Therein, it may be particularly advantageous if the safety circuit disengages a clutch with the energy store actuating a valve.

Herein, the valve can, for example, be a directional control valve which is actively moved to a release position usually against the energy store, for example, with electrical (electromagnetic) control.

In the method, it is furthermore generally advantageous if the safety circuit compares the clutch pressures when a total malfunction occurs by applying the clutch pressures to oppositely acting control surfaces of a logic valve.

Therein, it may be particularly advantageous if the logic valve comprises only one or even no spring.

In the hydraulic circuit, it is advantageous if the clutch circuits each comprise a release valve which is arranged between the pressure control valve and the clutch and is configured to engage or disengage the connection between the clutch and the assigned pressure control valve.

This enables disengagement of a clutch in the case of a malfunction without the need to adjust the pressure control valve accordingly.

Therein, it may be particularly advantageous if the release valves are each biased with an energy store to a disengaged position in which they disengage the connection between the clutch and the pressure control valve.

This enables "fail-safe" operation because the clutch can also be disengaged when the electrical energy supply fails.

It may be also advantageous if, in the disengaged position, the release valves connect the clutch with a further valve arrangement configured to connect the clutch with a tank or with a pressure maintaining device depending on whether a partial or a total malfunction has occurred.

This measure means that the functional differentiation between a partial malfunction and a total malfunction can be easily achieved with a further valve arrangement.

Therein, it may be particularly advantageous if the further valve arrangements are respectively formed by a control valve which is formed separately from the assigned release valve.

Alternatively, the further valve arrangements can respectively be integrated into the other release valve.

This results in a compact design with a low number of individual valves.

It may be generally advantageous if the safety circuit comprises a pressure maintaining device which generates a retaining pressure from the supply pressure for the clutch with the higher clutch pressure at the time of the total malfunction to maintain the transfer of torque via said clutch.

The pressure maintaining device generally generates the retaining pressure from the conduit pressure and indeed preferably such that the retaining pressure can also be generated from the conduit pressure independently of electrically controlled valve arrangements. For example, this is achieved by connecting the pressure maintaining device directly to the output of a pump of the hydraulic system, said pump being driven according to the speed of an engine and/or the vehicle speed. As a result, the retaining pressure can also be generated if the electrical power supply fails.

Therein, it may be particularly advantageous if the pressure maintaining device comprises a pressure comparison device which compares the first and the second clutch pressure, and, if a total malfunction occurs, supplies the retaining pressure to the clutch with the higher clutch pressure.

Herein, it may be particularly advantageous if the pressure comparison device comprises a directional control valve which can be actuated by oppositely arranged control surfaces which are connected with the first and second clutch pressure respectively.

Herein, it may be particularly advantageous that the pressure comparison device can be formed by a logic directional control valve which, in particular, does not require any springs or the like. The directional control valve is controlled in the manner of a "pressure scale".

Herein, it may be also advantageous if the control surfaces are adapted to the transfer behavior of the assigned clutch.

As a result, a "net pressure" acts on the control surfaces, said pressure reflecting the respective state of actuation of the assigned clutch. Due to the fact that the disengageable clutches of twin-clutch transmissions are often formed concentrically in relation to each other, it may be necessary for the "gross pressures" of the two disengageable clutches to be of a different size for an identical state of actuation. Adjusting the control surfaces results in the clutch which is more active than the other clutch remaining engaged in the case of a total malfunction.

It may be furthermore generally advantageous if the pressure maintaining device comprises a throttle device to soften the fall in pressure of the clutch to be disengaged if a malfunction occurs.

This enables the prevention of torque impacts if a malfunction occurs.

It should be understood that the abovementioned features and the features described below can be used in the indicated combinations and configurations, can be used in other combinations and configurations, and can be used alone.

BRIEF DESCRIPTION OF THE DRAWINGS

Embodiments of the invention are shown in the drawings and are explained in further detail in the following description.

DETAILED DESCRIPTION OF CERTAIN INVENTIVE EMBODIMENTS

Figure 1:
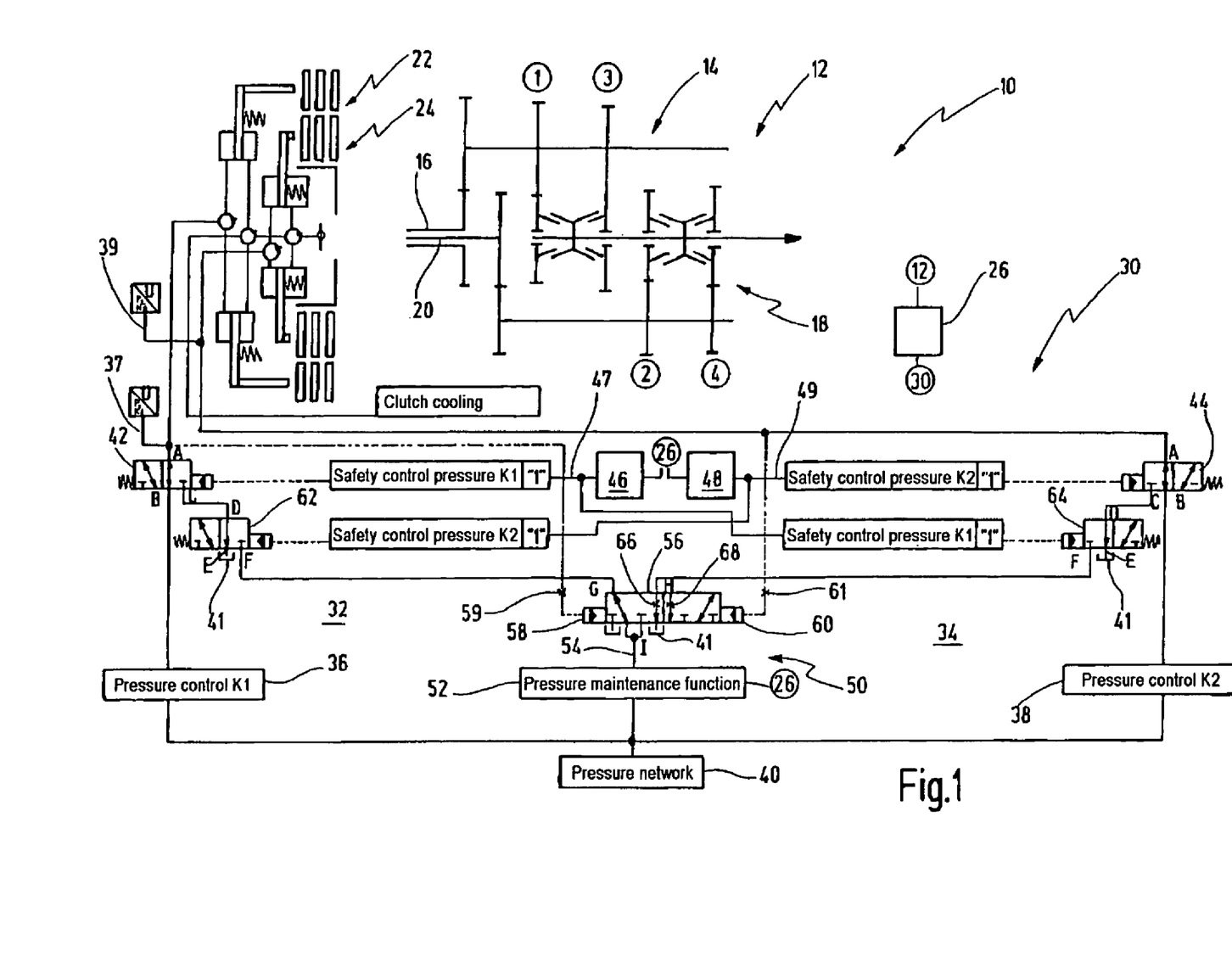
FIG. 1 is a schematic view of a first embodiment of a hydraulic circuit.

In FIG. 1, a first embodiment of a twin-clutch transmission according to the invention is referred to by 10.

Twin-clutch transmission 10 comprises, a spur gear transmission 12 with a plurality of wheel sets (in the case shown, for example, for gear steps 1 to 4). Therein, the spur gear transmission 12 comprises a first partial transmission 14 for gear steps 1 and 3 with a hollow input shaft 16. The spur gear transmission 12 further comprise a second partial transmission 18 for gear steps 2 and 4 with an input shaft 20. Input shaft 20 and hollow input shaft 16 are arranged concentrically in relation to each other.

Furthermore, twin-clutch transmission 10 comprises a first disengageable clutch or clutch 22 and a second disengageable clutch or clutch 24. Second clutch 24 is provided concentrically to first clutch 22, radially inside first clutch 22.

An output member of first clutch 22 is connected with hollow input shaft 16. An output member of second clutch 24 is connected with input shaft 20. The input members of both clutches 22, 24 are connected with an output shaft of an engine (for example, an internal combustion engine) of a motor vehicle (not shown).

Such a structure allows for gear changes to be made by actuating both clutches 22, 24 in an overlapping manner. Therein, the gear step of the target gear can already be engaged before initiating the gear change (by actuating the assigned clutch). The torque on the transmission input side can be transferred by actuating the disengageable clutch of the target gear. Herein, the disengageable clutch of the source gear can only be disengaged when the torque on the transmission input side has been completely or almost completely transferred. This means that a gear change can be performed without any reduction in tractive force.

The representation with four gear steps is only intended as an example. The spur gear transmission 12 can also comprise more or fewer gear steps.

A schematically displayed control device 26 is provided to control twin-clutch transmission 10. Control device 26 controls on the one hand spur gear transmission 12 (more precisely the clutches thereof) and on the other hand a hydraulic circuit 30 to actuate both clutches 22, 24.

Hydraulic circuit 30 comprises a first clutch circuit 32 for first clutch 22 and a second clutch circuit 34 for second clutch 24.

First clutch 32 comprises a pressure control device 36 for controlling clutch pressure 37 of first clutch 22. Second clutch 34 comprises a second pressure control device 38 for controlling clutch pressure 39 of second clutch 24.

Pressure control devices 36, 38 are connected to a pressure network 40 which provides a generally constant conduit pressure.

Hydraulic circuit 30 furthermore comprises a depressurized tank 41.

It is further provided that excess control oil is fed from the two clutches 22, 24 to a clutch cooling.

First pressure control device 36 is connected with first clutch 22 with a first release valve 42. Correspondingly, second pressure control device 38 is connected with second clutch 24 by means of a second release valve 44.

Release valves 42, 44 are each formed as directional control valves, in the present example as 3/2 directional control valves. Release valves 42, 44 each comprise a first connection A, a second connection B and a third connection C. Release valves 42, 44 are normally actively controlled such that connections A and B are connected, as a result of which respective pressure control devices 36, 38 are connected with assigned clutches 22, 24, as is shown in FIG. 1.

The active control is performed by a respective safety control pressure K1 or K2 which actuates release valves 42, 44 into the normal position shown in FIG. 1 against the force, for example, of a respective spring.

Safety control pressure K1 is generated by a release control device 46 which is connected with control device 26. Correspondingly, safety control pressure K2 is generated for second release valve 44 by a second release control device 48 which is also connected with control device 26.

Release control devices 46, 48, controlled by control device 26, normally generate respective safety control pressures K1 or K2 which are greater than zero (logic value "1"). If a malfunction affects first clutch 22, first clutch circuit 32 and/or first partial transmission 14, safety control pressure K1 is reduced to a logic value "0", as explained below.

Similarly, safety control pressure K2 is set by safety control device 48 to a logic value "0" when a malfunction affects second clutch 24, second clutch circuit 34 and/or second partial transmission 18.

Hydraulic circuit 30 further comprises a pressure maintaining device 50.

Pressure maintaining device 50 comprises a retaining pressure supply 52 which is connected with pressure network 40 and generates a retaining pressure 54.

Retaining pressure supply 52 is also connected with control device 26. If a signal is supplied to retaining pressure supply 52 that twin-clutch transmission 10 is functioning properly, no or a very low retaining pressure 54 is generated.

If this signal to retaining pressure supply 52 indicates that twin-clutch transmission 10 is not functioning properly, retaining pressure supply 52 generates retaining pressure 54 from pressure network 40 by using the conduit pressure supplied by pressure network 40 as retaining pressure 54.

In this case, value is to be placed, although this is not represented, on the fact that retaining pressure 54 is provided by purely hydraulically controlled means even when the entire electricity supply of the motor vehicle has failed. Provided that the internal combustion engine is still running, the pump for providing the conduit pressure can be driven and generates the conduit pressure via pressure network 40, said conduit pressure also being suitable for use as retaining pressure 54.

Pressure maintaining device 50 further comprises a logic valve 56. In this embodiment, logic valve 56 is formed as a 6/2 directional control valve with two opposite hydraulic control surfaces 58, 60.

Clutch pressure 37 is applied to control surface 58 via a restriction orifice 59. Clutch pressure 39 of second clutch 24 is applied to control surface 60 via a restriction orifice 61.

If first clutch pressure 37 is higher than second clutch pressure 39, logic valve 56 is located in the displayed switching position. If second clutch pressure 39 is higher than first clutch pressure 37, logic valve 56 switches to the second position.

Logic valve 56 comprises a first input connection I (formed by two connections) and two output connections G and H.

Pressure maintaining device 50 further comprises a first control valve 62 and a second control valve 64.

In this embodiment control valves 62, 64 are formed like release valves 42, 44 as 3/2 directional control valves. In normal operation, control valves 62, 64 are also actively actuated to a normal position, shown in FIG. 1, with a respective safety control pressure K2 or K1.

A connection D of first control valve 62 is connected with a connection C of first release valve 42. Correspondingly, a first connection D of second control valve 64 is connected with a connection C of second release valve 44.

First control valve 62 assigned to first release valve 42 is not controlled with safety control pressure K1, but rather with safety control pressure K2, which is generated by second release control device 48. Correspondingly, second control valve 64, which is assigned to second release valve 44, is controlled with safety control pressure K1, which is generated by first release control device 46.

Control valves 62, 64 each comprise a further connection E which is connected with tank 41. Moreover, first control valve 62 comprises a connection F which is connected with a connection G of logic valve 56. A corresponding connection F of second control valve 64 is connected with a connection H of logic valve 56.

The representation in FIG. 1 shows two conduit connections of logic valve 56 with restriction orifices 66 and 68 respectively. However, these may have no function in the embodiment of FIG. 1.

It should further be noted that control surfaces 58, 60 may well be identical but can also be different. In any case, they are adjusted to the transfer behavior of assigned clutch 22 or 24. Due to the fact that clutch 24 is arranged concentrically within first clutch 22, the pressure level for actuating second clutch 24 may be different than the pressure level for actuating first clutch 22. This varying transfer behavior can affect control surfaces 58, 60. Logic valve 56 is switched to the position which is assigned to the "more active" clutch of clutches 22, 24, namely the clutch which reflects the current state of twin-clutch transmission 10.

Safety control pressures K1, K2 generated by release control devices 46, 48 generally occupy one of two logical states. The logical status "1" corresponds to a pressure which corresponds to a force which is greater than the counterforce of the counterpressure springs respectively contained in release valves 42, 44 or control valves 62, 64.

The second pressure generated by release control devices 46, 48 is a pressure of logical "0". This can be a very low pressure which in any case generates a force which is less than the force generated by the respective counterpressure springs. The pressure with the logical status "0" can, for example, also be a pressure of zero.

Hydraulic circuit 30 substantially ensures particular reliability and ease-of-use of twin-clutch transmission 10, as explained below with reference to FIGS. 1 to 4.

FIG. 1 shows the "normal state" in which both safety control pressures K1, K2 are logically "1". This leads to release valves 42, 44 being in a switching position in which they directly connect pressure control devices 36, 38 with respectively assigned clutches 22, 24.

Control valves 62, 64 are also actively controlled. The switching position of both control valves 62, 64 is, however, irrelevant in the displayed normal state of this embodiment. This is even more applicable when, as in the present embodiment, retaining pressure 54 is also zero or logically "0" in the displayed normal state. This is because control device 26, in the normal state, controls retaining pressure supply 52 such that no retaining pressure 54 is generated.

Figure 2:
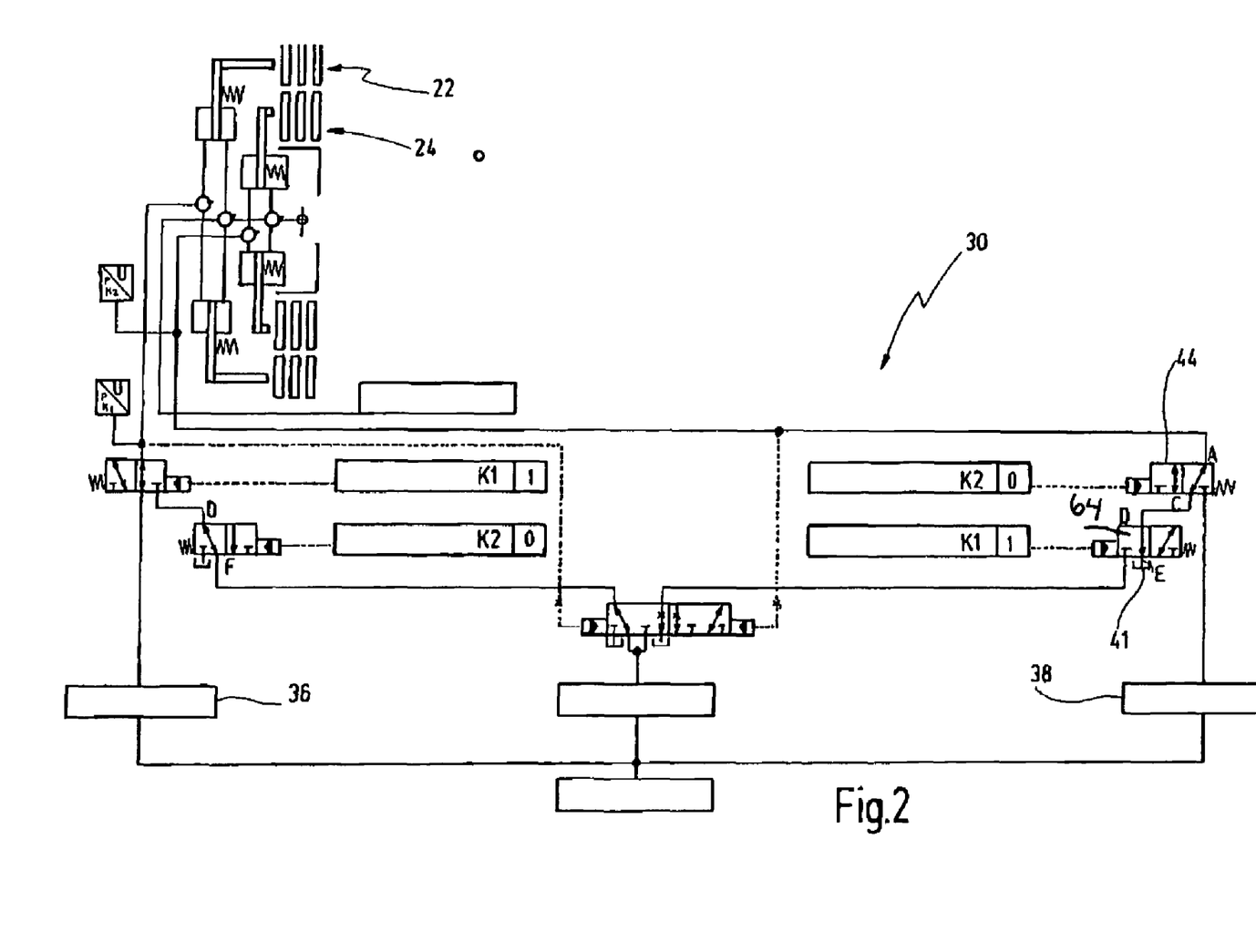
FIG. 2 shows the hydraulic circuit of FIG. 1 in the event of a partial malfunction affecting a clutch.

FIG. 2 shows a state in which a partial malfunction affecting second clutch 24, second clutch circuit 34 and/or second partial transmission 18 has occurred. In this case, second release control device 48 generates a safety control pressure K2 of logically "0". This leads to second release valve 44 being forced by the counterpressure spring into the second switching position in which clutch 24 is disengaged from assigned pressure control device 38. Instead, connection A of second release valve 44 is connected with connection C thereof and thus with connection D of second control valve 64. Second control valve 64 is controlled by safety control pressure K1 and is still active against the force of the counterpressure spring. Therein, connection D is connected by means of a conduit with connection E and thus with tank 41. As a result, second clutch 24 is depressurized. Second clutch 24 is disengaged.

The operation of first clutch 22, first clutch circuit 32 and first partial transmission 14 is, however, unchanged. First release control device 46 therefore still generates a safety control pressure K1 of logically "1".

As a result, first pressure control device 36 is connected, as previously, with first clutch 22.

Shown in FIG. 1, first clutch 22 is assigned to first partial transmission 14 with gear steps one and three. As a result, a suitable switching strategy enables starting solely with first clutch 22 and first partial transmission 14 in the first gear. Subsequently, for example, a switch from the first directly to the third gear can be performed. This naturally involves an interruption of tractive force. However, due to the fact that this relates to emergency operation, this is acceptable. It is vital that the driver can continue the journey in this case despite the failure of a key element in second clutch 24, second clutch circuit 34 and/or second partial transmission 18, namely in gear steps one and three. This not only enables slow operation, it is also possible to drive in higher speed regions.

Embodiments with more or fewer gear steps may function similarly. For example, embodiments with six gear steps, operation in the gear steps one, three and five is thus possible.

Figure 3:
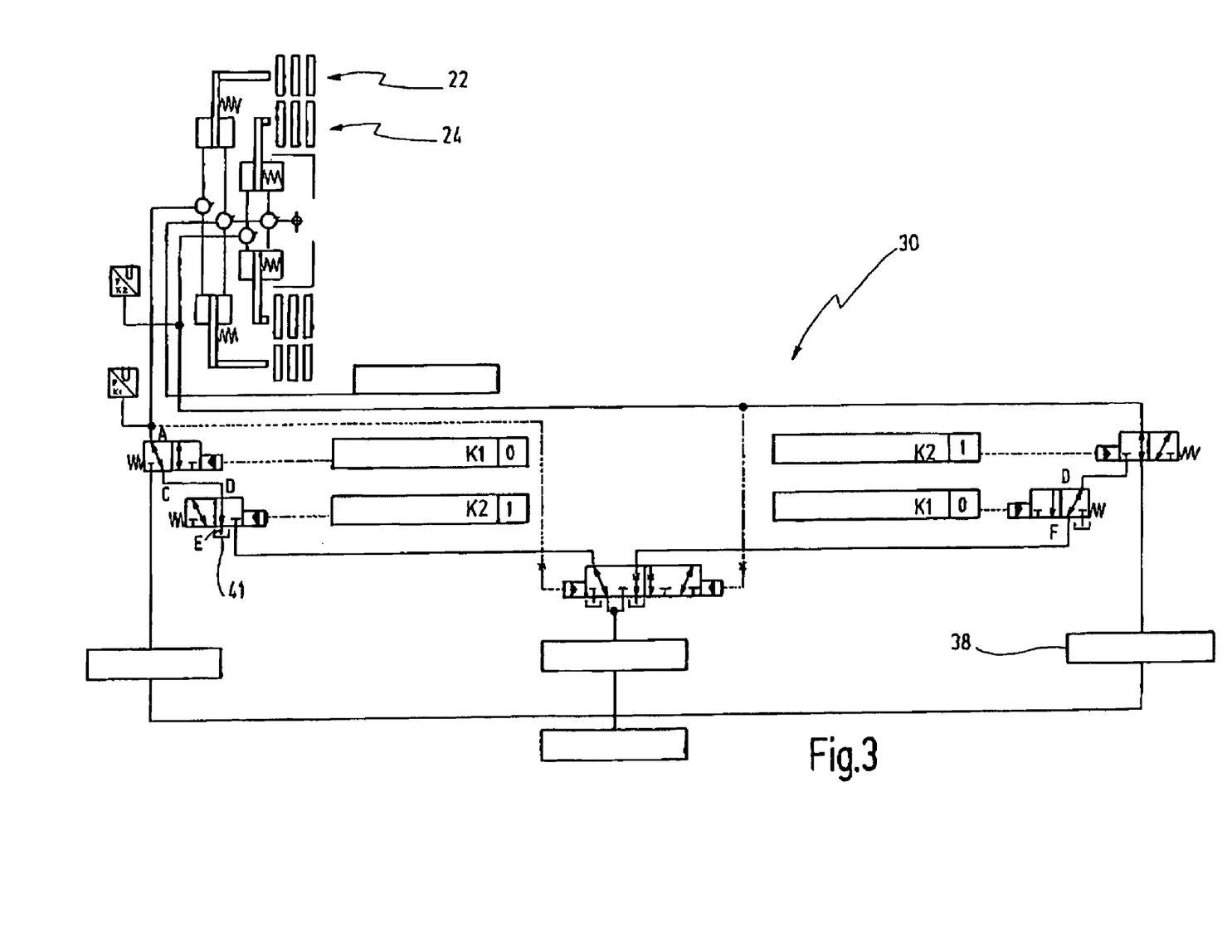
FIG. 3 shows the hydraulic circuit of FIG. 1 in the event of a partial malfunction affecting the other clutch.

FIG. 3 correspondingly shows a state in which a malfunction has occurred in first clutch 22, first clutch circuit 32 and/or first partial transmission 14. As a result, safety control pressure K1 is logically "0". First clutch 22 is disengaged from first pressure control device 36 and is connected with tank 41 via first release valve 42 and first control valve 62.

The function of second clutch 24 is maintained. In the embodiment shown, second clutch 24 operates second partial transmission 18 with gear steps two and four (in the case of a six gear transmission also gear step six). As a result, the driver can drive with gear steps two, four and six in emergency operation, for example, to a garage or the like.

Figure 4:
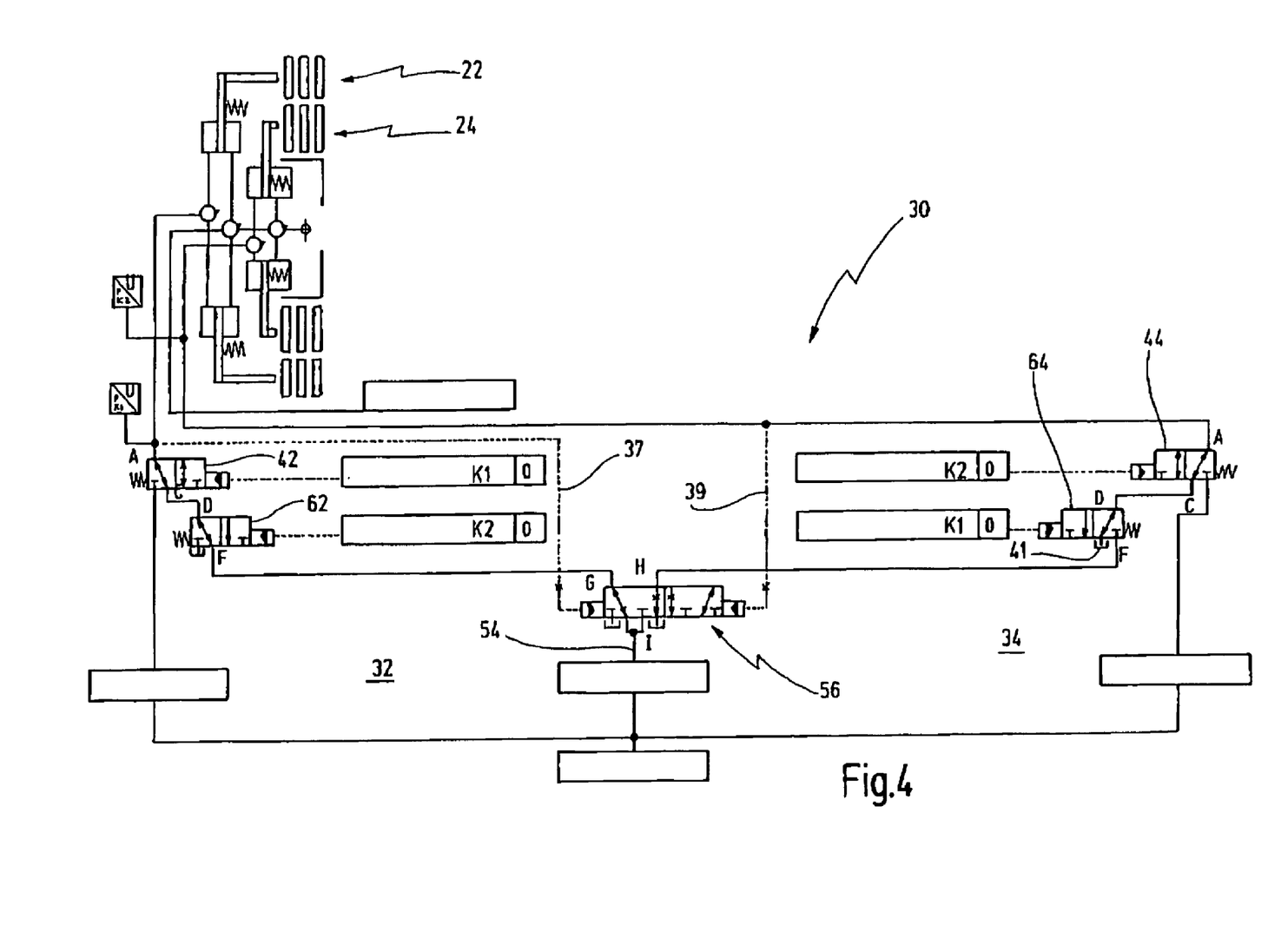
FIG. 4 shows the hydraulic circuit of FIG. 1 in the event of a total malfunction.

FIG. 4 shows the state when a total malfunction occurs. In this embodiment, a total malfunction is understood to be a case where a malfunction has occurred which affects both clutches 22, 24, both clutch circuits 32, 34 and/or both partial transmissions 14, 18. In this case, it is not possible to continue to drive on. However, for safety reasons, it is desirable that the more active clutch at the time of the total malfunction remains engaged, whereas the other clutch is automatically disengaged.

This is achieved as follows.

When the total malfunction occurs, both safety control pressures K1, K2 are logically "0".

As a result, clutches 22, 24 are disengaged from their respective pressure control devices 36, 38.

Release valves 42, 44 and control valves 62, 64 are actuated by the counterpressure spring into such a switching position that respective clutches 22, 24 are connected with connection G or connection H of logic valve 56 via connections A, C, D and F.

At the time of the total malfunction, logic valve 56 is located in one of its two switching positions depending on which clutch pressure 37, 39 is higher. In the case of the representation of FIG. 4, clutch pressure 37 of first clutch 22 is higher than clutch pressure 39 of second clutch 24.

As a result, in the representation of FIG. 4, first clutch 22 is supplied with retaining pressure 54 via connections I and G of logic valve 56 and connections F, D, C and A of first control valve 62 or of first release valve 42.

Due to the fact that retaining pressure 54 is drawn directly from the conduit pressure, first clutch 22 is engaged as a result. Retaining pressure supply 52 can comprise a pressure limitation to prevent one of clutches 22, 24 being overloaded by retaining pressure 54. Retaining pressure 54 is thus limited to the maximum permissible pressure of clutches 22, 24.

Due to the switching position of second release valve 44 and second control valve 64, second clutch 24 is connected with tank 41 via its connections A, C, D and E.

As a result, second clutch 24 is depressurized in the event of the total malfunction. This prevents a conflict between the two clutches 22, 24.

The total malfunction can, for example, take the form of a failure in the electrical supply for hydraulic circuit 30. In this case, the state shown in FIG. 4 is established without further supply of electrical energy. Due to the fact that first clutch 22 was the active clutch at the time of the total malfunction, first clutch 22 is engaged. As a result, torque can still be transferred via first clutch 22.

For example, if the vehicle of twin-clutch transmission 10 is in the process of overtaking in the event of the total malfunction, torque can still be transferred via first clutch 22 (and via the gear switched in first partial transmission 14) to the driving wheels of the motor vehicle even after the total malfunction occurs. As a result, safe driving operation can be maintained even after a total malfunction occurs.

The driver can then continue to drive the vehicle in the state established at the time of the total malfunction in order to reach a safe place to stop. In theory, it is conceivable for the driver to continue his journey in this state (with engaged clutch 22 and engaged gear step of first partial transmission 14). However, an alarm signal may be sent to the driver requesting that he stop the vehicle. In the event of a total malfunction, it is assumed that, for reasons of safety, the vehicle is no longer operated and is parked safely as quickly as possible.

Hydraulic circuit 30 of FIGS. 1 to 4 generally provides improved comfort. This is because, in the event of a partial malfunction, the vehicle can continue to be driven with the respective other power transmission train in order, for example, to reach a garage.

In the event of a total malfunction, the more active clutch of the two clutches 22, 24 remains engaged. Therefore, despite the total malfunction, torque can still be transferred to the driving wheels of the motor vehicle.

Without these features, when a total malfunction occurs, the entire hydraulic circuit is generally depressurized such that both clutches are disengaged. This can lead to a situation in which, when a total malfunction occurs during an overtaking procedure, suddenly no power is transferred to the driving wheels.

Such a situation can be reliably avoided with the hydraulic circuit of FIGS. 1 to 4.

FIGS. 5 to 8 show another embodiment of the hydraulic circuit which is generally designated in these figures by 30'.

Figure 5:
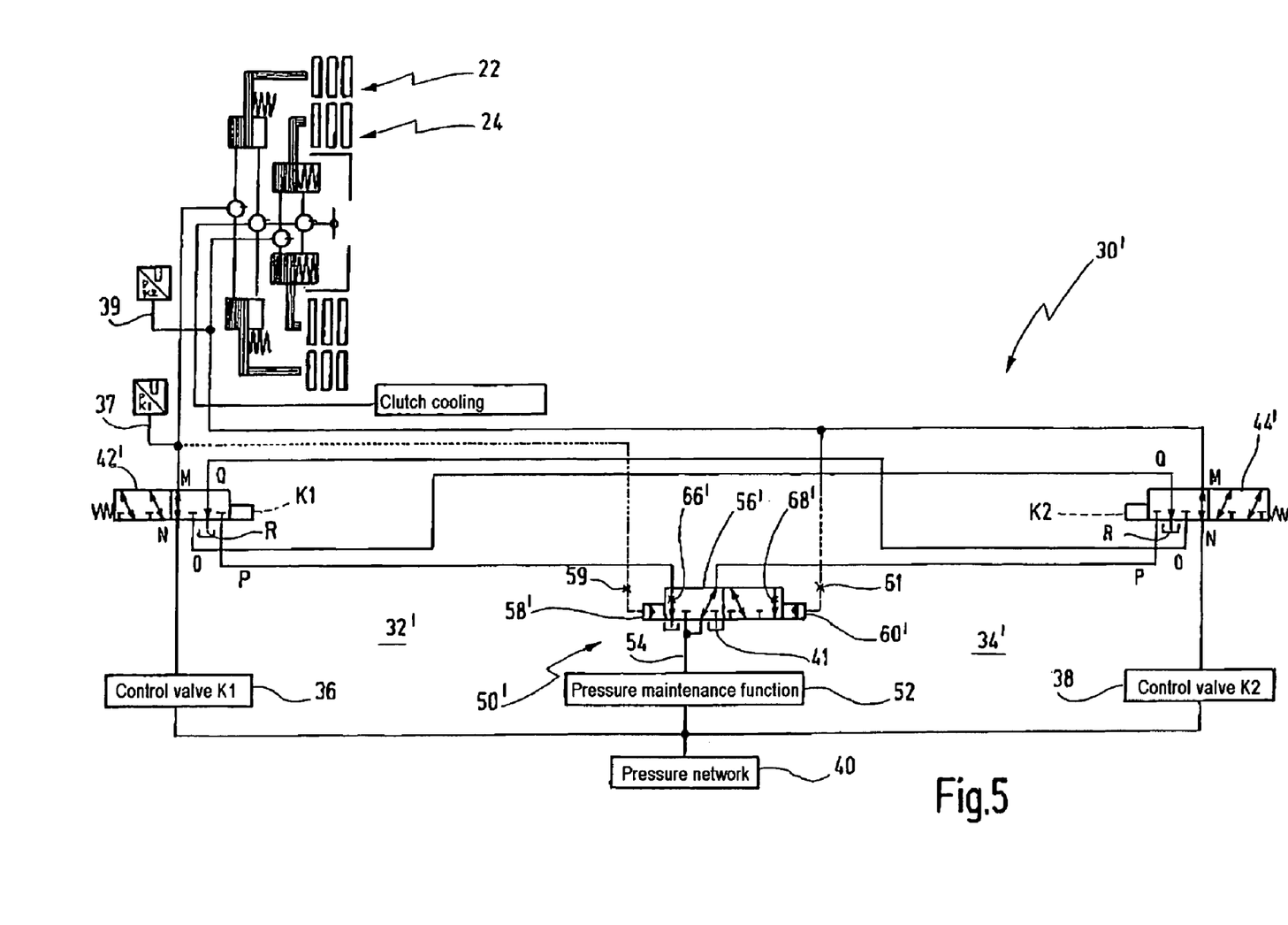
FIG. 5 shows a schematic representation of an alternative embodiment of a hydraulic circuit.
Figure 6:
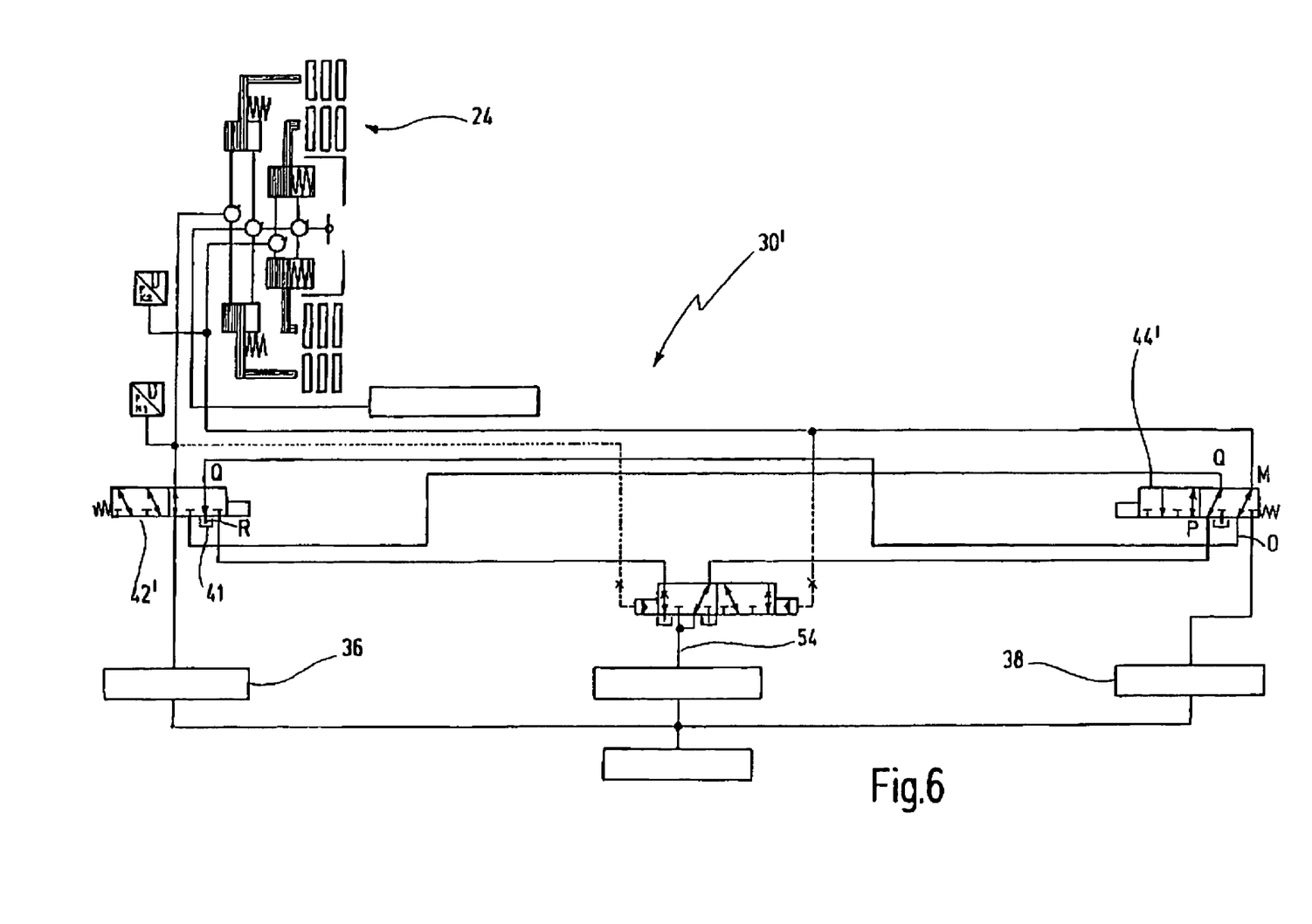
FIG. 6 shows the hydraulic circuit of FIG. 5 in the event of a partial malfunction affecting a clutch.

In some embodiments, hydraulic circuit 30' of FIGS. 5 to 6 is similar to hydraulic circuit 30 of FIGS. 1 to 4 in terms of structure and function, with the exception of the features described below. For similar structure or function, reference is made to the above description of FIGS. 1 to 4.

While, in the case of hydraulic circuit 30 of FIGS. 1 to 4, a release valve 42 and a control valve 62 are assigned to each clutch, in the case of hydraulic circuit 30', only a single release valve 42' or 44' is provided in their place.

Therein, release valve 42' includes the functionality of first release valve 42 and second control valve 64 of hydraulic circuit 30'. Second release valve 44' includes the functionality of second release valve 44 and first control valve 62 of hydraulic circuit 30.

As a result, only safety control pressure K1 is applied to first release valve 42'. Correspondingly, only second safety control pressure K2 is applied to second release valve 44'.

In some embodiments, release valves 42', 44' are respectively formed as 6/2 directional control valves and perform similar functionality as explained above in relation to release valves 42, 44 and control valves 62, 64.

FIG. 5 shows the normal state in which clutches 22, 24 are connected with their assigned pressure control devices 36, 38.

The remaining connections of release valves 42', 44' are not used in this state.

FIG. 6 shows the state in which a partial malfunction affecting second clutch 24 has occurred. Second release valve 44' has been pressed into the second switching position, namely by the counterpressure spring. Therein, second clutch 24 is therefore connected with tank 41 via connections M and O of second release valve 44' and connections Q and R of first release valve 42'. First clutch 22 is further connected with assigned pressure control device 36 via first release valve 42'.

Figure 7:
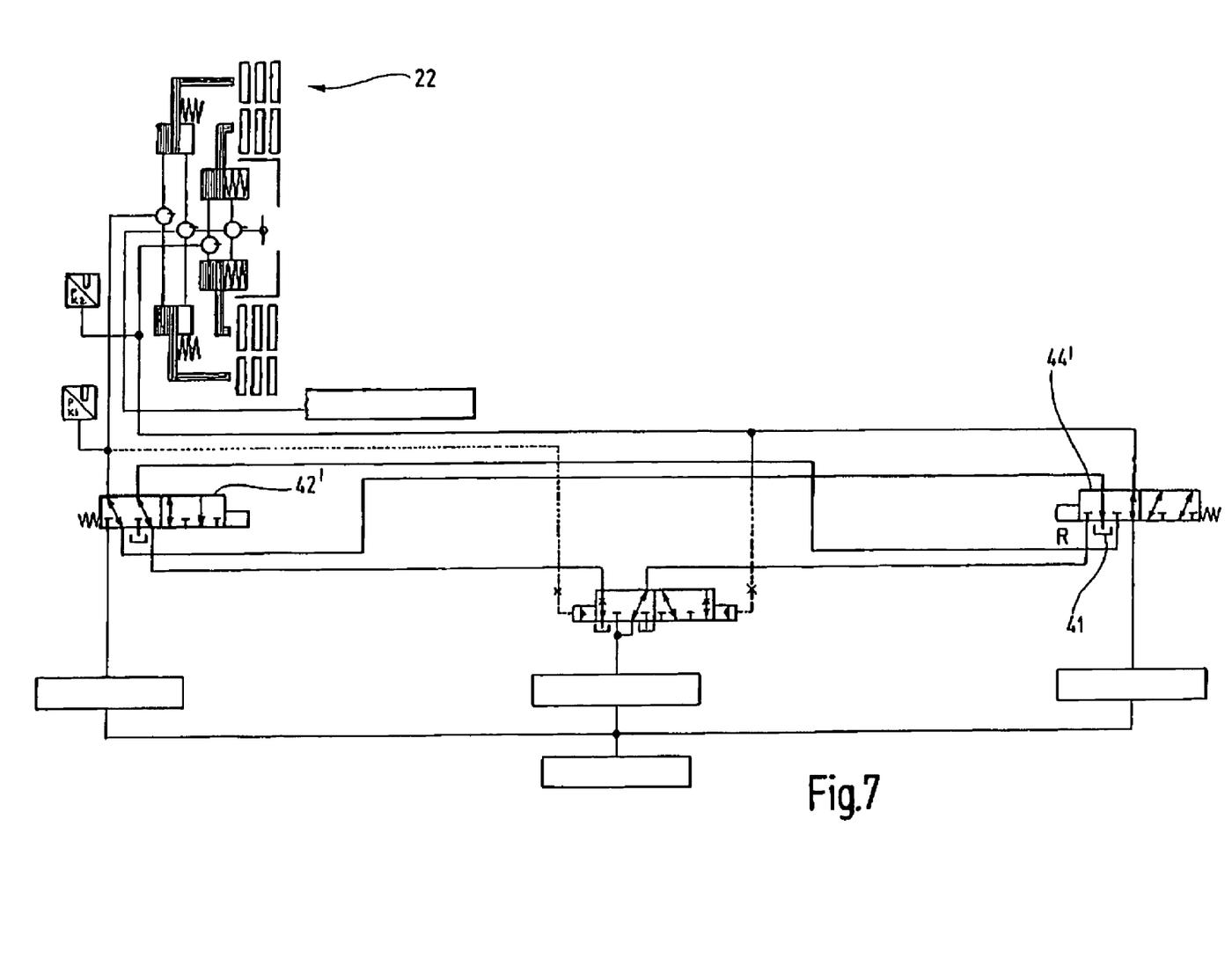
FIG. 7 shows the hydraulic circuit of FIG. 5 in the event of a partial malfunction affecting the other clutch.

FIG. 7 shows the corresponding state in which a partial malfunction affecting first clutch 22 has occurred. In this case, first clutch 22 is connected with tank connection R of second release valve 44' via the two release valves 42', 44'.

Figure 8:
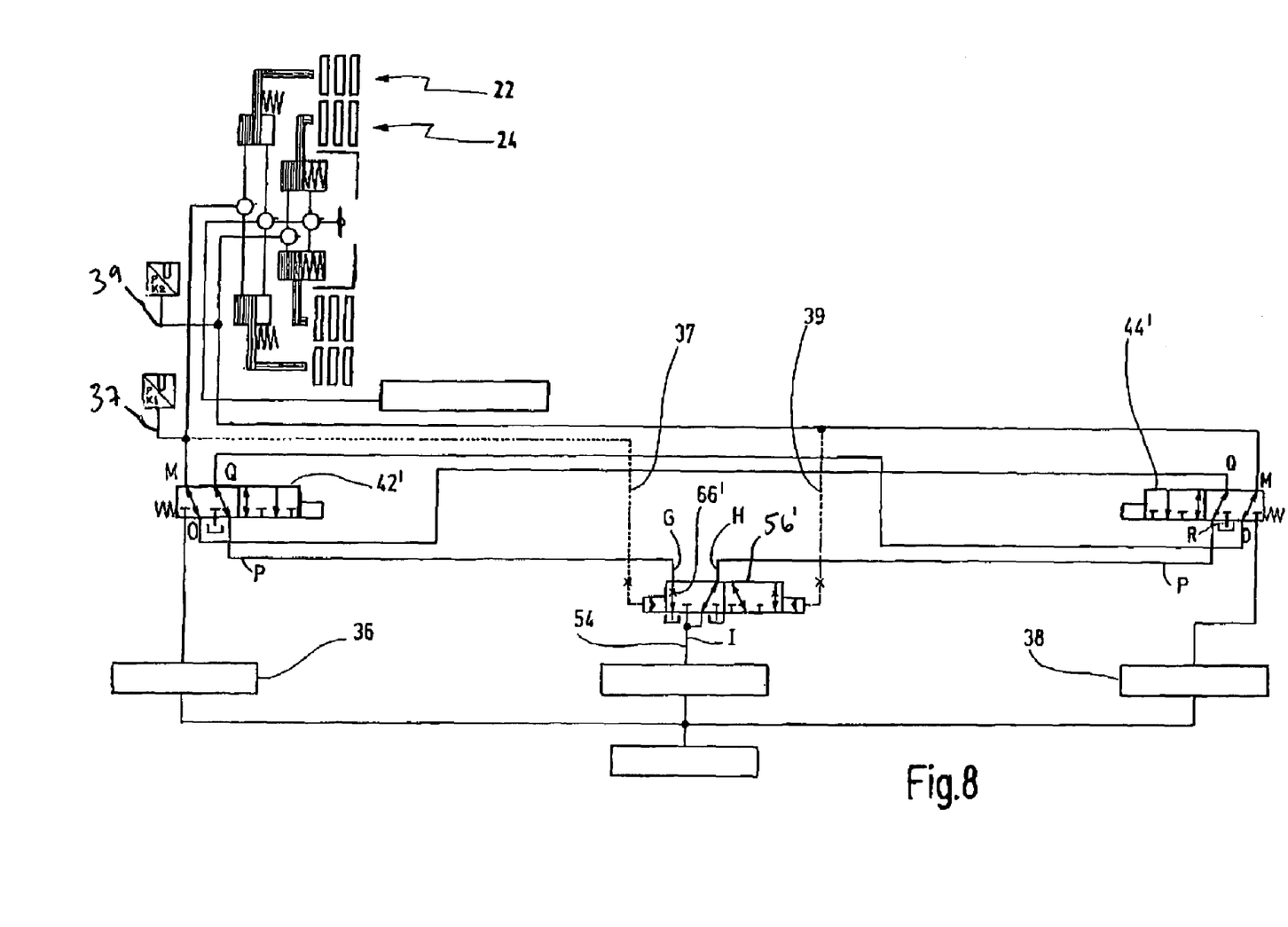
FIG. 8 shows the hydraulic circuit of FIG. 5 in the event of a total malfunction.

FIG. 8 shows the occurrence of a total malfunction.

In this case, both release valves 42', 44' are in their respective second switching position in which they disengage clutches 22, 24 from assigned pressure control devices 36, 38.

FIG. 8 further shows the state in which clutch pressure 37 of first clutch 22 is higher than clutch pressure 39 of second clutch 24.

As a result, in the event of the total malfunction, first clutch 22 is connected with a connection H of logic valve 56' via connections M, O of first release valve 42' and connections Q and P of second release valve 44'. In the represented state (FIG. 8), connection H is directly connected with connection I on which retaining pressure 54 is applied. As a result, first clutch 22 is engaged by means of retaining pressure 54.

Second clutch 24 is connected with connection G of logic valve 56' via connections M and O of second release valve 44' and connections Q and P of first release valve 42'. Connection G of the logic valve is connected with tank 41 via a restriction orifice 66' in the switching position shown.

As a result, clutch pressure 39 of second clutch 24 is not suddenly reduced to zero, but rather gradually throttled down towards the tank. This therefore prevents sudden changes in state.

It is obvious that the actuation of valves 42, 44, 62, 64 or 42', 44' can also directly use electrical, for example, electromagnetic, means instead of a hydraulic safety control pressure, wherein the logical states "1" and "0" are maintained.

Figure 9:
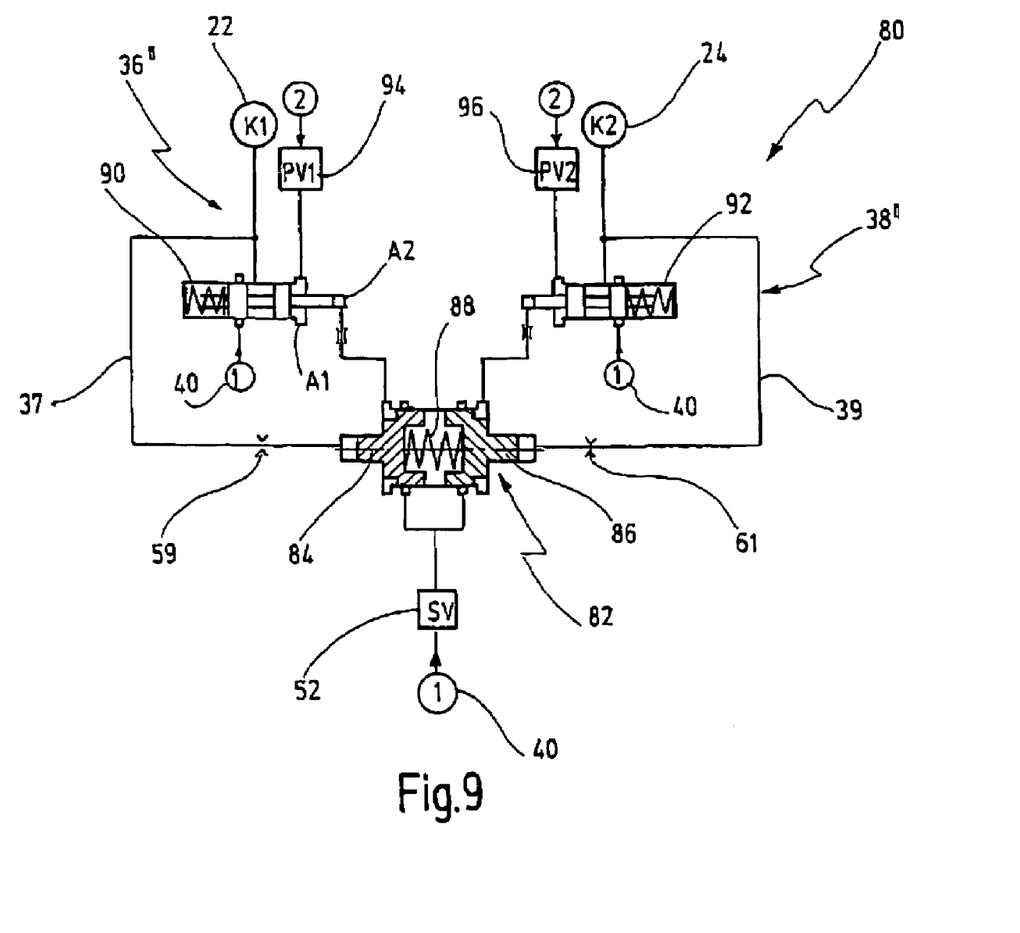
FIG. 9 shows another embodiment of a hydraulic circuit.

FIG. 9 shows another embodiment of a hydraulic circuit 80 for a twin-clutch transmission. For the sake of simplicity, identical elements to hydraulic circuits 30, 30' have been assigned identical reference numbers.

Hydraulic circuit 80 is configured, in the case of a malfunction occurring (irrespective of whether this is a partial malfunction or a total malfunction), to supply the more active clutch of the two clutches 22, 24 with a conduit pressure from a pressure network 40 (possibly also pressure-limited). As with the above mentioned embodiments, this means that, in the event of a malfunction, the more active clutch remains engaged in order to be able to continue to transmit torque.

This is achieved in the case of hydraulic circuit 80 using a modified pressure maintaining device comprising a logic valve 82.

Logic valve 82 comprises two slides 84, 86 between which an individual spring 88 is arranged.

Spring 88 presses the two slides 84, 86 outwards opposite to each other.

Clutch pressures 37 and 39 respectively are applied to opposite control surfaces of logic valve 82 (via respective restriction orifices 59 and 61). If clutch pressure 37 of first clutch 22 is higher, slide 84 on which said pressure acts is moved towards second slide 86. As a result, an output (retaining pressure) of a retaining pressure supply 52 is connected with a control surface $A_2$ of a pressure control valve 90. Pressure control valve 90 normally acts to control the pressure of first clutch K1. To this end, pressure control valve 90 comprises a control surface Al which is supplied with a pressure from a first control valve 94. Depending on the level of the control pressure from control valve 94, a slide of pressure control valve 90 is moved against a spring and releases a restriction orifice towards pressure network 40.

Control surface $A_1$ used for this purpose is significantly larger than control surface $A_2$.

A corresponding second pressure control valve 92 which is controlled by a second control valve 96 is provided for second clutch 24.

Retaining pressure supply 52 is normally not active such that its output is depressurized. Logic valve 82 switches backwards and forwards depending on which of the two clutches 22, 24 is currently active, wherein both slides are moved left or right respectively. Spring 88 is used to produce a basic state of logic valve 82 and disengages retaining pressure supply 52 in this basic state from pressure control valves 90 and 92 respectively when clutch pressures 37 and 39 are both small against the force of spring 88.

In cases where a malfunction occurs while none of the two clutches 22, 24 is active, a retaining pressure equal to the conduit pressure from pressure network 40 is generated from retaining pressure supply 52. However, this is not transferred to clutches 22, 24 due to the fact that the described basic state has been established by spring 88.

In cases where a malfunction occurs and one of the two clutches 22, 24 is active (e.g. clutch 22), the retaining pressure is applied to control surface $A_2$ via logic valve 82. As a result, a pressure is exerted on the slide of pressure control valve 90 sufficient to move the slide against the force of the spring irrespective of the output of control valve 94. This means that clutch K1 is impacted with the conduit pressure from pressure network 40 and is thus engaged.

Second slide 86 of logic valve 82 disengages second pressure control valve 92 from the retaining pressure such that second clutch 24 is not impacted with the conduit pressure.

Hydraulic circuit 80, which is shown in FIG. 9, does not satisfy the functionality of differentiating between a partial and a total malfunction. In the case of hydraulic circuit 80 of FIG. 9, in the event of a malfunction, the more active clutch of the two clutches 22, 24 is engaged. This means that, in the event of a malfunction, torque can still be transferred as before via the respectively engaged clutch such that safety problems in particular such as a malfunction during an overtaking maneuver are avoided.

Emergency driving operation with only one of the two clutches over an extended period of time is, may or may not be practical with the use of hydraulic circuit 80.

While the present invention has been particularly shown and described with reference to certain embodiments thereof, it will be understood by those of ordinary skill in the art that various changes in form and details may be made therein without departing from the spirit and scope of the present invention.

What is claimed is:

1. A method of controlling a hydraulic circuit for a twin-clutch transmission for motor vehicles, wherein the hydraulic circuit comprises first and second clutches that can be hydraulically actuated, the pressures of said clutches being controlled with respective pressure control valves, and wherein a safety circuit creates a safe state for the hydraulic circuit if a malfunction occurs, the method comprising:

when a partial malfunction affecting only one of the two clutches occurs, disengaging the affected clutch; and when a total malfunction affecting both clutches occurs, disengaging the clutch with the lower clutch pressure at the time of the total malfunction, and maintaining the clutch with the higher clutch pressure at the time of the total malfunction engaged, wherein the transfer of torque via said clutch is maintained.

2. The method as claimed in claim 1, disengaging either or both of the first and second clutches comprises disengaging the connection between the clutch to be disengaged and the assigned pressure control valve to reduce the clutch pressure.

3. The method as claimed in claim 2, wherein the clutch pressure is reduced when disengaging the clutch by depressurizing the clutch.

4. The method as claimed in claim 2, wherein the clutch pressure is gradually reduced when disengaging the clutch.

5. The method as claimed in claim 1, wherein at least one clutch is disengaged with a mechanical or hydraulic energy store.

6. The method as claimed in claim 5, wherein disengaging the at least one clutch comprises the energy store actuating a valve.

7. The method as claimed in claim 1, further comprises comparing pressures of the first and second clutches when a total malfunction occurs by applying the pressures of the first and second clutches to oppositely acting control surfaces of a logic valve.

8. A hydraulic circuit for a twin-clutch transmission, the circuit comprising:

first and second clutches that can be hydraulically actuated;

first and second clutch circuits, wherein the first clutch circuit comprises a first pressure control valve configured to control a first clutch pressure for the first clutch, and the second clutch circuit comprises a second pressure control valve configured to control a second clutch pressure for the second clutch; and a safety circuit, configured to disengage the first clutch if the first clutch is affected by a malfunction and the second clutch is not affected by the malfunction, to disengage the second clutch if the second clutch is affected by a malfunction and the first clutch is not affected by the malfunction, and if the first and second clutches are both affected by a malfunction, to disengage the clutch having a lower clutch pressure, wherein the clutch having a higher clutch pressure remains engaged.

9. The hydraulic circuit as claimed in claim 8, wherein the first and second clutch circuits each comprise a release valve which is arranged between the pressure control valve of the clutch circuit and the clutch associated with the clutch circuit and each clutch circuit is configured to engage or disengage the connection between the clutch associated with the clutch circuit and the pressure control valve of the clutch circuit.

10. The hydraulic circuit as claimed in claim 9, wherein each release valve is biased with an energy store to a disengaged position in which the release valve disengages the connection between the clutch associated with the clutch circuit and the pressure control valve of the clutch circuit.

11. The hydraulic circuit as claimed in claim 10, wherein, in the disengaged position, each of the release valves connect the clutch associated with the clutch circuit with another valve configured to selectively connect the clutch associated with the clutch circuit with a tank and with a pressure maintaining device depending on whether a malfunction affects both clutches or a single clutch.

12. The hydraulic circuit as claimed in claim 11, wherein each of the other valves respectively comprise a control valve which is formed separately from the release valve associated with the clutch circuit.

13. The hydraulic circuit as claimed in claim 11, wherein the other valves are integrated into a single valve unit.

14. The hydraulic circuit as claimed in claim 8, wherein the safety circuit comprises a pressure maintaining device configured to generate a retaining pressure for the clutch with the higher clutch pressure at the time of malfunction to maintain the transfer of torque via said clutch.

15. The hydraulic circuit as claimed in claim 14, wherein the pressure maintaining device comprises a pressure comparison device which compares pressures of the first and second clutches.

16. The hydraulic circuit as claimed in claim 15, wherein the pressure comparison device comprises a directional control valve which can be actuated by oppositely arranged control surfaces which are connected with the first and second clutch pressures, respectively.

17. The hydraulic circuit as claimed in claim 16, wherein the control surfaces are adapted to the transfer behavior of the assigned clutch.

18. The hydraulic circuit as claimed in claim 14, wherein the pressure maintaining device comprises a throttle device to soften the fall in pressure of the clutch to be disengaged if a malfunction occurs.

* * * * *